United States Patent
Epis et al.

(10) Patent No.: US 8,706,649 B1
(45) Date of Patent: Apr. 22, 2014

(54) ELECTRONIC SINGLE ACTION SOFTWARE DISTRIBUTION

(75) Inventors: Glenn Epis, Sunnyvale, CA (US); Judy Halchin, Cupertino, CA (US); Chris Sharp, San Jose, CA (US); Eduardo Cue, Mountain View, CA (US); Thomas Alan Fitzgerald, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1689 days.

(21) Appl. No.: 09/945,208

(22) Filed: Aug. 31, 2001

(51) Int. Cl.
*G06Q 10/00* (2012.01)

(52) U.S. Cl.
USPC .............................. 705/344; 705/58; 717/178

(58) Field of Classification Search
CPC . H04L 63/0884; H04L 67/142; H04L 67/146; H04L 9/32; H04L 2463/102; G06Q 20/3821
USPC ................... 705/1.1–500; 709/232; 717/178; 715/208
See application file for complete search history.

(56) References Cited

U.S. PATENT DOCUMENTS

| | | | | |
|---|---|---|---|---|
| 6,041,309 A | * | 3/2000 | Laor | 705/14 |
| 6,073,124 A | * | 6/2000 | Krishnan et al. | 705/59 |
| 6,141,698 A | * | 10/2000 | Krishnan et al. | 719/331 |

OTHER PUBLICATIONS

Barber, David; Building a digital library: concepts and issues. (part 1: introduction, definitions, strategic issues, general issues); Sep.-Oct. 1996; Library Technology Reports, v32,n5, p. 573(44).*

* cited by examiner

*Primary Examiner* — Adam Revine
(74) *Attorney, Agent, or Firm* — Park, Vaughan, Fleming & Dowler LLP

(57) ABSTRACT

Deep linking to a URL of a download is obviated by the generation of a dynamic symbolic system link. When a user is at a download page, the HTML source for the displayed download button does not contain the URL of the download site. Selection of the button sends as form values the product ID and a session ID to the server which generates a dynamic link. This link is returned to the browser to redirect it to the download site. The link is further set to expire after the session so that, even if the link is captured, after expiration it will be unable to reach the download site.

8 Claims, 3 Drawing Sheets

ELECTRONIC SINGLE ACTION SOFTWARE DISTRIBUTION

BACKGROUND OF THE INVENTION

1. Field of the Invention

The present invention relates generally to electronic software distribution (ESD) and, more particularly, to ESD methods an apparatus wherein a temporary URL is dynamically generated by an ESD server to provide a web page link to a download server.

2. Description of the Related Art

Electronic software distribution generally refers to the purchase and sale of software products or titles through a virtual store over the Internet and the subsequent electronic download of the purchased title from a download server to a client computer. The software titles available through ESD typically include executable program code and multimedia content. The virtual store is typically a website consisting of one or more web pages located at a merchant's web server that, when viewed at the client through the web browser executing at the client, display the store's contents, i.e., a listing of the available titles along with a brief description and price for each.

Although ESD is a highly preferable method and means for distributing electronically stored titles, ESD has also given rise to an entirely new set of problems and solutions in the protection of a software publisher's rights to its respective titles, as compared to distribution of "boxed" titles stored on disk or other readable medium and distributed through retail outlets. Without any protection of the publisher's rights incorporated into the ESD method or apparatus, after an initial copy of a title has been downloaded, such title would be capable of being freely copied and distributed without further payment to the publisher in violation of the publisher's rights.

To provide maximum protection to the publisher, when the client computer has accessed the virtual store and a title selection has been made, a sequence of events occurs which obtains payment information for the title, authenticates such information, and then makes the purchased title available for download. The availability for download is typically made through a web page that displays the purchased title and a download button. Selection of the download button through the client computer graphic user interface, i.e., a mouse click with the cursor placed on such button, sends a request to the download server with the URL of the purchased product.

Prior to the title being downloaded, download authorization may also have had to be obtained by using one of various digital rights management schemes. Generally, these techniques obtain and verify license information. Although the known digital rights management techniques provide a high degree of security, these techniques may also disadvantageously add significant overhead cost to ESD and, accordingly, limit their use to only such titles wherein maximum protection against unauthorized use is required.

Example of such costs include the establishment and programming of licensing and email servers typically used in the known digital rights management schemes. Although the overhead cost (as prorated against all such purchased titles) may be minimal when compared to the purchase price of an individual title, as in the case of expensive complex programs or widely distributed multimedia content, a limitation of such digital rights management schemes is that such overhead costs may significantly raise the purchase price of lower cost titles wherein some degree of unauthorized use may be tolerated by the publisher.

Although, the publisher may not be desirous of providing robust protection on certain titles, the publisher may also not be desirous of distributing such titles freely, such titles commonly known as "freeware." The publisher may nonetheless only be interested in minimizing and not eliminating the number of pirated copies of the software. In effect, the publisher relies upon the honesty of a purchaser of a copy of a title, and thus being out of pocket for the purchase price, would not be induced to record a copy of the title on tangible computer readable media and provide such media to others.

Another disadvantage and limitation of digital rights management is that once a user has paid for a protected copy of software, certain events may occur which could cause such user to lose access to such software. These events include a crash of the hard disk in the client computer upon which purchased titles have been stored, thereby requiring a new copy of each of the titles to be loaded. However, even if the user maintained an archive copy of the original downloaded title, some digital rights management schemes will not allow the title to be reloaded on a new disk as a form of copy protection. Accordingly, the user either has to contact the publisher or vendor with proof of purchase to obtain a replacement copy of the title, or its "keys" to unlock the archived copy, or be forced to buy an entirely new copy altogether.

Another disadvantage and limitation of known ESD virtual stores is that once the download page is provided to the client computer with the URL of the title at the download site, such URL may be recorded for later unauthorized use. Typically, the URL is a static address of the location of the title at the download server that needs to remain active, such that the URL can be provided to legitimate subsequent purchasers of the title. In a problem called deep linking, the URL after it has been recorded may be distributed through email, Usenet or other websites, such that unauthorized users may freely download the title that another has paid for located at this URL.

Accordingly, deep linking enables a greater degree of unauthorized access and use in that the static URL may now be freely obtained worldwide, as compared to the limited distribution of unauthorized copies of a title distributed through tangible media. Although the aforementioned digital rights management schemes may render the unauthorized copies obtained through deep linking to be generally unusable, such schemes do nothing to prevent deep linking. Even with digital rights management, unauthorized copies of titles obtained through deep linking may be vulnerable to being unlocked and then freely distributed.

Yet another disadvantage and limitation of known ESD virtual stores is that products of different types, namely boxed software titles, hardware and ESD titles, are generally not capable of being ordered or paid for in a single on-line transaction. For example, although the virtual store's contents may list these different types of products on one or more pages, typically the selection of the non-ESD items (the boxed software titles and hardware) results in a shopping cart style transaction to occur, whereas selection of one or more ESD titles results in a redirect to another web server. The redirect is typically made to a digital rights management web server operated by a provider (or its licensee) of a particular digital rights management scheme, such as discussed above.

A further disadvantage and limitation relating to this type of virtual store is that the redirect may either open a new second window for the ESD transaction, or may cause the shopping cart window to close and have only the ESD window active. In either event, two transactions are then required at the client, the purchase of the shopping cart items at the virtual store for subsequent physical delivery, and the purchase of the ESD title from the digital rights server to effect the electronic download.

Therefore, a need exists for a virtual store which overcomes one or more disadvantages and limitations of the prior art hereinabove set forth. There exists a need wherein a virtual store can provide a subsequent copy of an ESD title to a purchaser of such title in the event of loss of the original copy of such title. There also exists a need for a virtual store wherein ESD titles can not be obtained through deep linking by unauthorized users. There exists a further need for a virtual store in which ESD and non-ESD items may be purchased in a single transaction.

SUMMARY OF THE INVENTION

It is an object of the present invention to overcome one or more disadvantages of the prior art hereinabove set forth. It is another object of the present invention to provide an ESD method and apparatus wherein a subsequent copy of an ESD title may be provided to a purchaser of such title in the event of loss of the original copy of such title. It is also an object of the present invention to provide an ESD method and apparatus wherein ESD titles can not be obtained through deep linking by unauthorized users. It is a further object of the present invention to provide an ESD method and apparatus wherein ESD and non-ESD items may be purchased in a single transaction.

According to the present invention, deep linking to a URL of a download is obviated by the generation of a dynamic symbolic system link. When a user is at a download page, the HTML source for the displayed download button does not contain the URL of the download site. Selection of the button sends as form values the product ID and a session ID to the server which generates a dynamic link. This link is returned to the browser to redirect it to the download site. The link is further set to expire after the session so that, even if the link is captured, after expiration it will be unable to reach the download site.

A feature of the present invention is that the link is derived from a combination of parameters unique to a user session, it is advantageous that it can not be later used for deep linking. Another feature of the present invention is the persistence of user activity at the store. Since deep linking, even if by an authorized user is minimized, the persistence advantageously allows the authorized user to obtain copies of prior purchased software in the event the original has become corrupted or lost.

These and other objects, advantages and features of the present invention will become readily apparent to those skilled in the art from a study of the following Description of the Exemplary Preferred Embodiments when read in conjunction with the attached Drawing and appended Claims.

DESCRIPTION OF THE EXEMPLARY PREFERRED EMBODIMENTS

Figure 1:
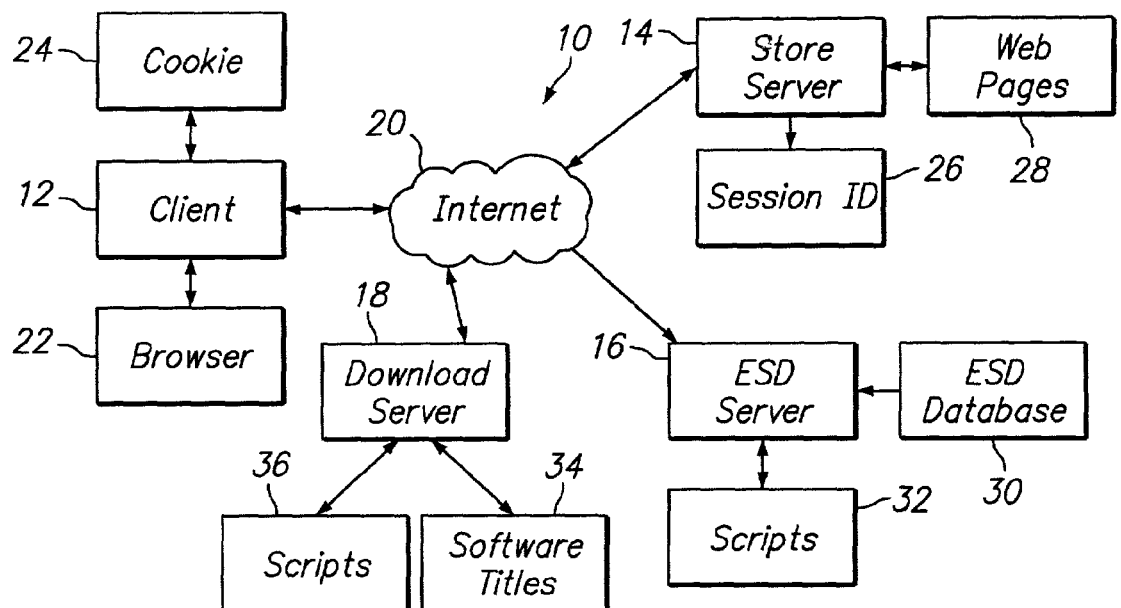
FIG. 1 is a schematic diagram of a computer system constructed according to the principles of the present invention.

Referring now to FIG. 1, there is shown a computer system 10 including a client computer 12, a store server 14, an ESD server 16 and a download server 18. Each of the client 12, the store server 14, the ESD server 16 and the download server 18 are selectively in communication with each other over a computer network 20. Although the computer network 20 may be any public or private network which allows selective communication between clients and servers, the network 20 is preferably the Internet.

As is well known, internal within the client 12 is a computer readable medium on which may be stored a browser program 22 and a cookie 24. Generally, the cookie 24 is an alphanumeric identification written to the client 12 when the client 12 connects to a server, for example store server 14, over the computer network 20. The server upon the client 12 being connected thereto writes the cookie such that upon each subsequent visit by the client 12 to such server, the server can read the cookie 24 and identify the client 12.

Also as is well known, the store server 14 generates a session ID 26 upon initial connection thereto by another device, for example client 12, connecting to the store server 14 over the computer network 20. The session ID 26 is typically an alphanumeric identification. The store server 14 also includes a plurality of web pages 28. Each of web pages 28 are selectively viewable at the client 12 through the browser program 22, also as is conventionally known. The web pages 28 may be used within the system 10 to construct a virtual store, as described below. The session ID 26 and the web pages 28 are typically stored on a computer readable medium internal to the store server 16.

The ESD server 16 includes an ESD database 30 and one or more scripts 32. The scripts 32 are small executable programs stored at a computer readable medium internal within the server 16, wherein such scripts 32 execute the below described method and functions of the present invention. The ESD database 30, in a virtual store environment, maintains a record of transactions between the client 12 and store server 14. The ESD database 30 is also stored on such computer readable medium.

The download server 18 includes a plurality of electronically stored software titles 34 and one or more scripts 36. Similarly as described above, the software titles 34 and the scripts 36 are stored at a computer readable medium internal within the download server 18.

Figure 2:
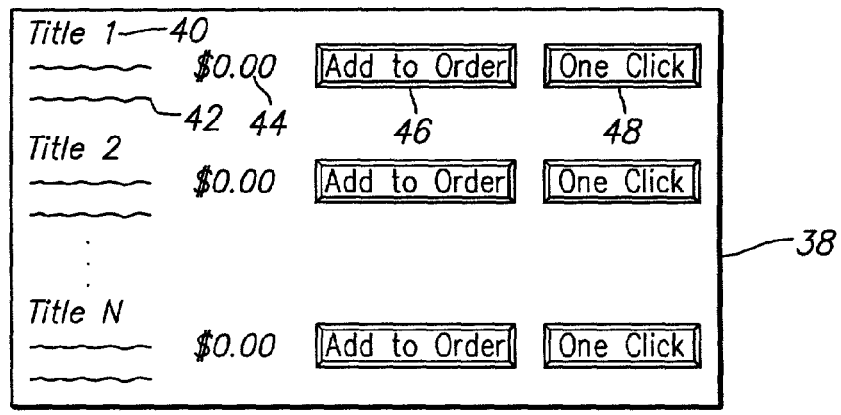
FIGS. 2-6 are exemplary web pages showing in greater detail the web pages of FIG. 1.

Referring now to FIG. 2, there is shown an exemplary web page 38, being one of the web pages 28. The web page 38 is adapted to list a plurality of ESD software titles 40, along with a conventional description 42 of the software title 40 as well as its price 44. Associated with each software title 40 is a first indicia 46 and an alphanumeric identification included in the HTML text of the web page 38. The first indicia 46 is typically displayed as an "Add to Order" button as best seen in FIG. 2. The alphanumeric identification associated with the title 40 uniquely identifies the title 40 within the system 10.

More particularly, the first indicia 46 is selectable through the user interface of the client 12 when the web page 38 is being viewed thereat. Upon the first indicia being selected, the alphanumeric identification associated with the title 40 is transmitted from the client 12. Conventionally, the first indicia 46 is generated by an HTML input tag of the form <INPUT TYPE="image" SRC="_" NAME="_">, wherein the SRC parameter contains a URL of a source image for the button and the alphanumeric identification associated with the title 40 is included in the NAME parameter. The alphanumeric identification of the NAME parameter is sent as a form value to a form processing script upon selection of the indicia 46.

In another embodiment of the present invention, the web page 38 may also includes a second indicia 48 associated with each software title 40, which may be displayed as a "One-Click" button. The alphanumeric identification associated with the software title 40 is also contained in the name parameter of the HTML input tag used to generate the second indicia 48. As described in greater detail hereinbelow, the second indicia 48 is only made visible when one click features have been enabled.

Figure 3:
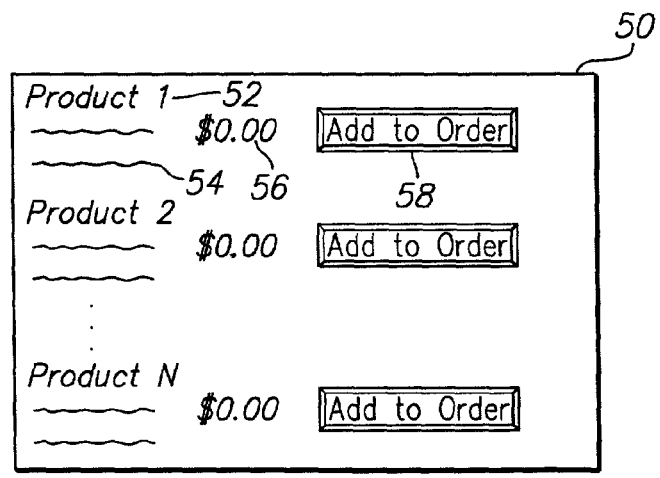

In one particular embodiment of the present invention, the web pages 28 may also include a web page 50, as best seen in FIG. 3. The web page 50 includes a listing of non-ESD products 52, similarly with a description 54 and price 56 of each product 52. Also associated with each non-ESD product 52 is a third indicia 58, similar to the first indicia 46 of FIG. 2, except that the name parameter of the input tag used to generate the third indicia 58 will contain an alphanumeric identification unique to the non-ESD product 52.

Figure 4:
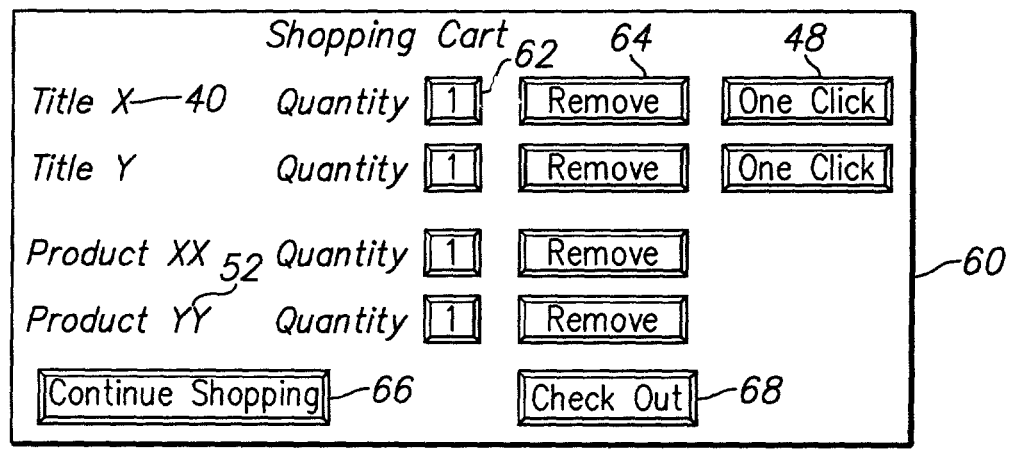

Within reference now to FIG. 4, one of the web pages 28 may also be a shopping cart page 60. The shopping cart page 60 when viewed will display all of the heretofore selected items, for example, each selected ESD software title 40 and each selected non-ESD product 52. Conventional within the art, and associated with each selected items, is an ordered quantity indicator 62, a remove button 64, a continue shopping button 66 and a checkout button 68. In the embodiment of the present invention wherein the one click feature is active, the one click button 48, described in conjunction with FIG. 2, is also present.

Figure 5:
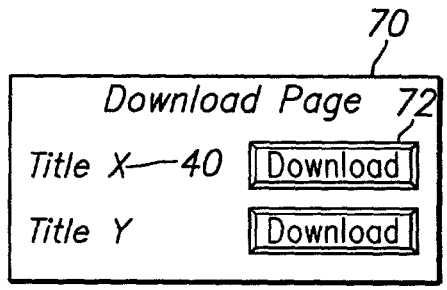

With reference now to FIG. 5, another one of the web pages 28 may also be a download page 70. As described in further detail hereinbelow, the download page 70 is viewed at the client 12 upon selection of either the checkout button 68 from the shopping cart page 60 or from the one click button 48 from the either of the web page 38 (FIG. 2) or the shopping cart page 60. The download page 70 includes a listing of each selected ESD software title 40 and a download button 72. Selection of the download button 72 initiates a process as described below, wherein a link to the URL at the download server 18 where the software titles 34 to be downloaded are located is not visible in the HTML source of the download page 70. The download button 72 is also generated from a HTML input tag with the alphanumeric identification of the associated software title 40 contained in the name parameter.

Figure 6:
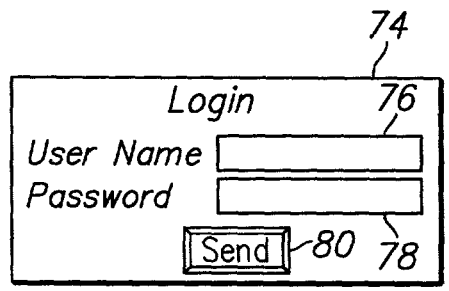

With reference to FIG. 6, another one of the web pages 28 may also be a login page 74. Conventionally, the login page 74 contains a username field 76, a password field 78 and a send button 80. Selection of the send button 80 transmits the username and password from the client 12 to the store server 14. The store server 14 authenticates the username and password, and if authenticated, writes to the client 12 the cookie 24. In the event a user profile for this user indicates that the one click option is enabled, the one click button 48 will be made visible on the web pages 38 and 60 described hereinabove. Otherwise, the one click button 48 will be suppressed.

Figure 7A:
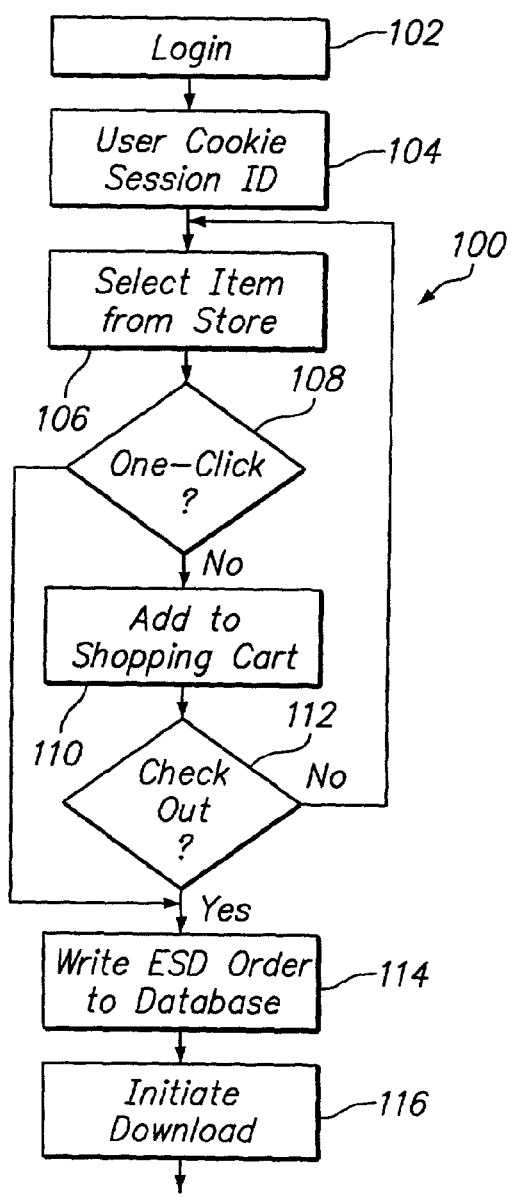
FIG. 7A-B is a flowchart useful to describe the operation of the system of FIG. 1.
Figure 7B:
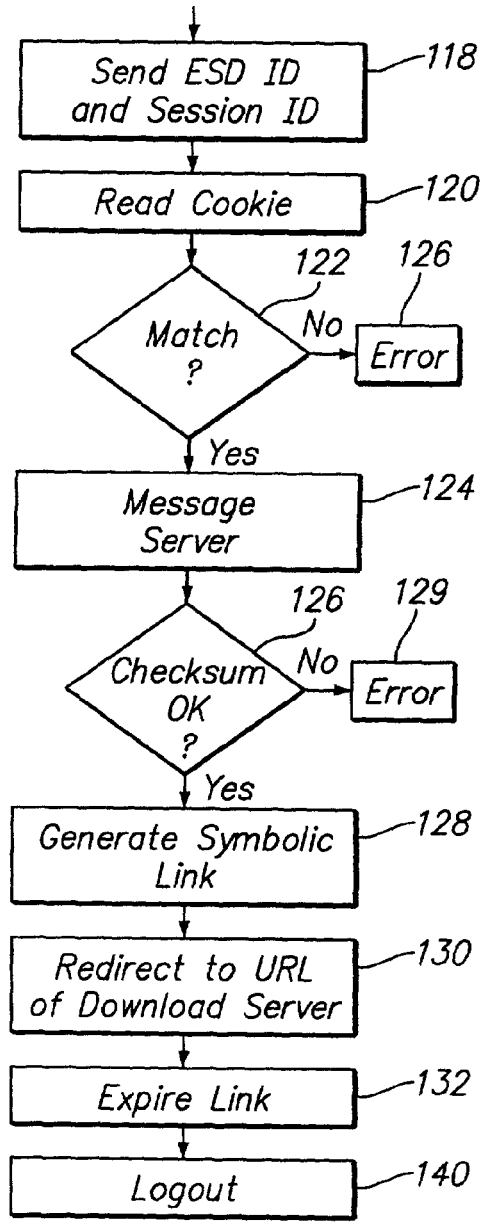

With reference now to FIG. 7A-B, there is shown a flowchart 100 useful to describe the operation of the system 10 hereinabove described. As indicated at step 102, the user at the client 12 may login into the store server 14 from the login page 74. Upon the user successfully executing a login, the store server 14 writes the user cookie 24 to the client 12 and stores the session ID 26 at the store server 14, as indicated at step 104.

Alternatively, the user need not log in to initiate the process of the flowchart 100, but may begin the process at step 106 were at the user selects items from the virtual store from the web pages of FIG. 2 or FIG. 3. However, the user will be required to establish a log in upon selection of the checkout button 68 or the one click button 48.

At step 108, the decision is made whether the user desires to purchase the ESD item by selection of the one click button 48, if one click is enabled. If no, the a path is taken to step 110 were at the selected items added to the shopping cart page 60. At step 112, a decision is made whether the user has selected checkout button 68. If no, the passes taken in returning to step 106 to select more items, for example by selecting the continue shopping button 66. If yes, a path is taken to step 114 wherein an electronic order is generated for the ESD software titles 40 within the shopping cart page 60. Orders for non-ESD items are conventionally processed and need not be further discussed. If one click had been enabled, and the users selected the one click button 48 at step 108, a path is also taken to step 114, thereby bypassing step 110 and step 112.

As is known, a user who has one click enabled, would be to have credit card and related purchase information on file at the store server 14 such that payment for the selected ESD software title 40 can be authenticated. Otherwise, as is also known, upon selection of the checkout button 68 at step 112, the user will be prompted through other web pages 28 to enter credit card and payment information so that payment can be authenticated.

The electronic order written to the ESD database 30 at step 114 includes the alphanumeric identification of the selected software title 40 and the alphanumeric identification used to generate the cookie 24. It is to be noted that the user when logged in to the store server 14 can, through another one of the web pages 28, view the entries for such user within the database 30. In such way, the user has a history of all titles ordered and also of software keys purchased, such that the user may obtain additional copies thereof. At step 116, the user initiates the download by selecting the download button 72 from the download page 70.

As best seen in FIG. 7B, the store server 14 sends the alphanumeric identification for the selected software title 40 and the session ID 26 to the ESD server 16, as indicated at step 118. The scripts 32 running at the ESD server 16 and read the user cookie 24, as indicated at step 120. Furthermore, the scripts 32 at the ESD server 16 compare, as indicated at the decision step 122, the user cookie 24 read from the client 12 to the alphanumeric identification stored for such user in the database 30. If the cookie 24 as read matches the information within the ESD database 30, then a path is taken to step 124, otherwise an error is displayed as indicated at step 126.

At step 124, the ESD server 16 sends a message to the download server 18 over a different port from the current connection with information of the alphanumeric identification for the software title 40 and the session ID which is then check-summed by the scripts 36, as indicated at the decision step 126. If the check sum is okay, a path is taken to step 128, otherwise in error is displayed as indicated that step 129. Alternatively, a different server (not shown) may perform this function.

As indicated at step 128, a dynamic symbolic system link is generated wherein this link points to the URL of the desired software titles 40 as electronically stored among the software titles 34 at download server 18. A make link script requires to two command line arguments, being the directory name of the source file and the directory name of the target file. A message sent to the make link script includes the source file name and the target file name. If the make link script is successful, a link is returned pointing to the URL at the download server of the purchase software title 40 within the software titles 34.

The browser 22 is then redirected to this URL at the download server 18, as indicated at step 130. Upon the browser 22 being redirected, the download of the purchase software title 40 from the download server 18 commences to the client 12.

To prevent deep linking, the generated URL may expire after said period of time as indicated at step 132. Accordingly, even if the user at the client 12 was able to capture the URL during the download, such link will expire and not be able to be utilized to reach the download server 18 in the future. As indicated at step 140, the user will then log out of store server 14.

There has been described above novel methods and apparatus for a virtual store. Those skilled in the art may now make numerous uses of and departures from the hereinabove described embodiments without departing from the inventive concepts disclosed herein. Accordingly, the present invention is to be defined solely by the permissible scope of the appended Claims.

What is claimed as the invention is:

1. A method for distributing electronically stored files via a virtual store system, the method comprising:
   generating a session ID when a client connects to a server that implements the virtual store system;
   providing a web page to the client, the web page having HTML source including a description of a plurality of files for download, wherein the HTML source does not include visible URL links for downloading the plurality of files;
   receiving an alphanumeric identification corresponding to a selection of one of the plurality of electronically stored files;
   generating a dynamic symbolic system link as a function of the alphanumeric identification and said session ID;
   providing the client the dynamic symbolic system link for access to the selected file;
   storing in a database the alphanumeric identification of the selected file in association with a user identifier; and
   expiring said symbolic system link.

2. The method according to claim 1, the method further comprising:
   setting at the client a user cookie;
   writing the user cookie and the alphanumeric identification into the database in association with each other;
   reading the user cookie at the client in response to receiving the alphanumeric identification and the session ID
   comparing the user cookie written in the database and the user cookie at the client, said generating being performed only if a match occurs between the user cookie written in the database and the user cookie at the client.

3. The method according to claim 1, wherein said dynamic symbolic system link is expired after a predetermined amount of time elapses.

4. The method according to claim 1, wherein said dynamic symbolic system link is expired after the selected file is downloaded.

5. A non-transitory computer readable medium containing executable program code for distributing electronically stored files via a virtual store system, said code implementing a procedure comprising:
   generating a session ID when a client connects to a server that implements the virtual store system;
   providing a web page to the client, the web page having HTML source including a description of a plurality of files for download, wherein the HTML source does not include visible URL links for downloading the plurality of files;
   receiving an alphanumeric identification corresponding to a selection of one of the plurality of electronically stored files;
   generating a dynamic symbolic system link as a function of the alphanumeric identification and said session ID;
   providing the client the dynamic symbolic system link for access to the selected file;
   storing in a database the alphanumeric identification of the selected file in association with a user identifier; and
   expiring said symbolic system link.

6. The non-transitory computer readable medium according to claim 5, the procedure further comprising:
   setting at the client a user cookie;
   writing the user cookie and the alphanumeric identification into the database in association with each other;
   reading the user cookie at the client in response to receiving the alphanumeric identification and the session ID
   comparing the user cookie written in the database and the user cookie at the client, said generating being performed only if a match occurs between the user cookie written in the database and the user cookie at the client.

7. The non-transitory computer readable medium according to claim 5, wherein said dynamic symbolic system link is expired after a predetermined amount of time elapses.

8. The non-transitory computer readable medium according to claim 5, wherein said dynamic symbolic system link is expired after the selected file is downloaded.

* * * * *